United States Patent [19]
Martinez

[11] Patent Number: 4,797,898
[45] Date of Patent: Jan. 10, 1989

[54] METHOD AND APPARATUS FOR EQUALIZATION OF DATA TRANSMISSION SYSTEM

[75] Inventor: Aldo A. Martinez, Miami, Fla.

[73] Assignee: Racal Data Communications Inc., Sunrise, Fla.

[21] Appl. No.: 933,654

[22] Filed: Nov. 21, 1986

[51] Int. Cl.[4] .................... H03H 3/40; H04B 3/14
[52] U.S. Cl. ........................... 375/7; 375/12; 375/109
[58] Field of Search ............... 375/7, 8, 12, 13, 14, 375/109, 96; 333/18, 28 R; 364/724

[56] References Cited

U.S. PATENT DOCUMENTS

| | | | |
|---|---|---|---|
| 3,271,679 | 9/1966 | Fostoff | 455/44 |
| 3,582,879 | 6/1971 | Sullivan | 375/8 |
| 3,593,142 | 7/1971 | Freeny | 375/109 |
| 4,433,425 | 2/1984 | de Jaeger | 375/13 |
| 4,455,665 | 6/1984 | Kromer, III | 375/96 |
| 4,483,009 | 11/1984 | Honda et al. | 375/14 |
| 4,489,416 | 12/1984 | Stuart | 375/13 |
| 4,516,269 | 5/1985 | Krinock | 375/13 |
| 4,561,111 | 12/1985 | Conner | 455/63 |
| 4,606,044 | 8/1986 | Kudo | 375/13 |
| 4,606,045 | 8/1986 | Miller | 375/13 |
| 4,669,090 | 5/1987 | Betts et al. | 375/13 |

Primary Examiner—Robert L. Griffin
Assistant Examiner—Stephen Chin
Attorney, Agent, or Firm—Jerry A. Miller

[57] ABSTRACT

A data communication system, comprising a first and a second transceiver coupled together through a transmission channel, the transmission channel having transmission characteristics. A measurement circuit is coupled to the first transceiver for measuring the effects of the transmission characteristics upon a known signal transmitted from the second transceiver to the first transceiver a mapping of the transmission characteristics to a code is made and the code is transmitted from the first transceiver to the second transceiver. A plurality of predetermined filters for use in filtering signals to be transmitted by the second transceiver is selected upon receipt of the transmitted code.

17 Claims, 6 Drawing Sheets

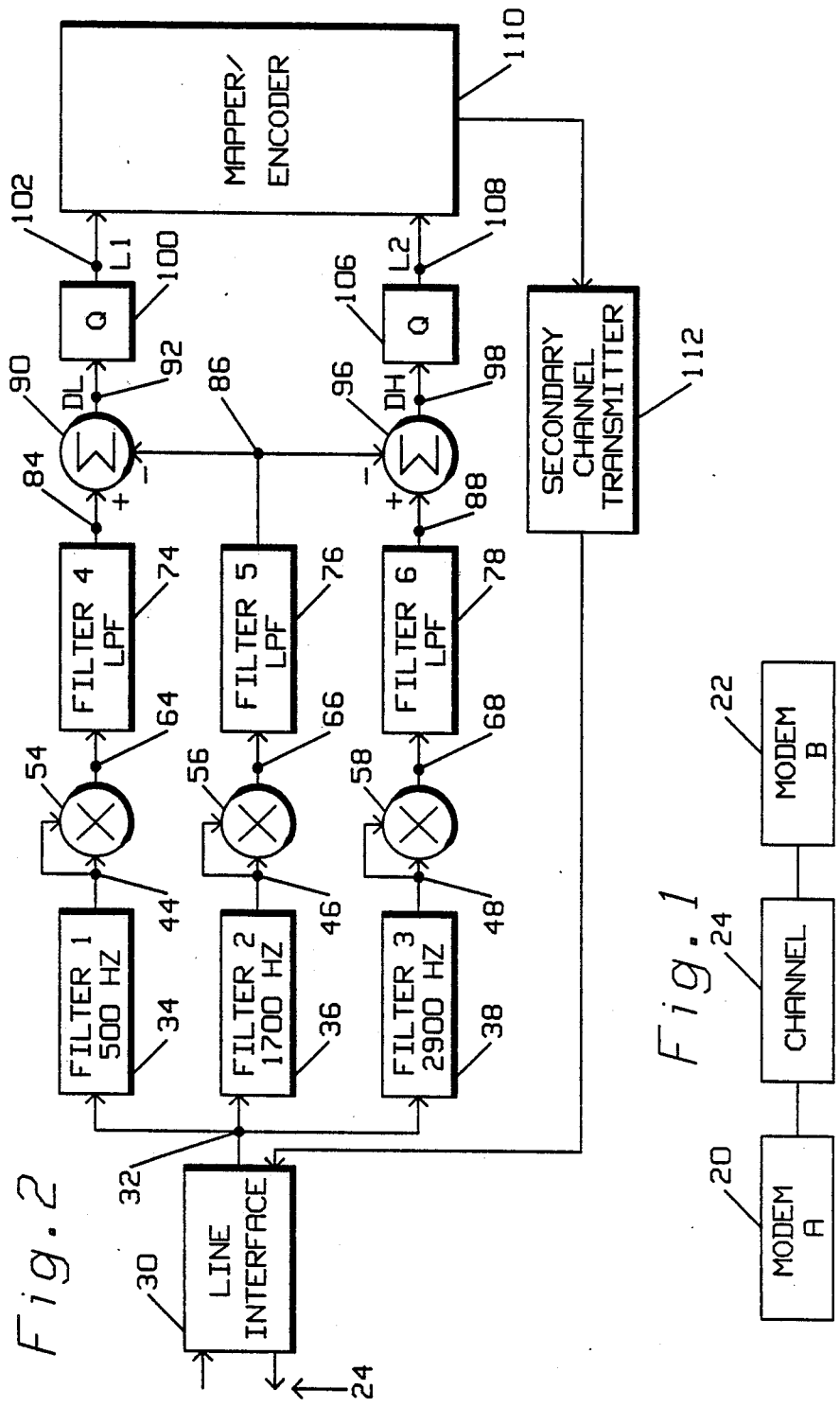

| MAPPER | | | | | | | | | |
|---|---|---|---|---|---|---|---|---|---|
| CODE | 0000 | 0001 | 0010 | 0011 | 0100 | 0101 | 0110 | 0111 | 1000 |
| EQUALIZER | 1 | 2 | 3 | 4 | 5 | 6 | 7 | 8 | 9 |
| L2 | +1 | 0 | -1 | +1 | 0 | -1 | +1 | 0 | -1 |
| L1 | +1 | +1 | +1 | 0 | 0 | 0 | -1 | -1 | -1 |

| DL | L1 |
|---|---|
| >0db | +1 |
| -3 to 0db | 0 |
| <-3db | -1 |

| DH | L2 |
|---|---|
| >-3db | +1 |
| -3 to -9db | 0 |
| <-9db | -1 |

METHOD AND APPARATUS FOR EQUALIZATION OF DATA TRANSMISSION SYSTEM

BACKGROUND

1. Field of the Invention

This invention relates generally to the field of amplitude equalizes for data transmission systems. More particularly it relates to an automatic equalization arrangement for use in data modems.

2. Background of the Invention

It is well known that transmission lines used for data communications have amplitude characteristics which vary widely from line to line. It is also known that the characteristics of a particular line are prone to changing as a result of age, weather, etc. As the speed of data transmission increases, it becomes more and more critical that the transmission line be provided with amplitude equalization in order to enhance the probability of minimizing errors in data transmission. This equalization is best carried out by pre-emphasizing the signal transmitted over the transmission medium at the transmitter output in order to correct the attenuation distortion. The reason for this is that, while the same or better degree of equalization can be achieved in the receiver, additional gain provided by equalization in the transmitter has the benefit of not amplifying channel noise. Thus, transmitter equalization is preferable so that signal to noise ratio degradation does not occur at the receiver.

Although receiver equalization can utilize adaptive filtering techniques which can be advantageously used to correct the transmission line characteristics, it is preferable that at least a coarse degree of transmitter equalization be provided for the reason outlined above. Receiver equalization can then be used as a fine tuning mechanism in order to achieve optimal equalization.

In conventional data communications systems such as those based upon data modems, plurality of such transmitter equalizers may be provided each having a distinct equalization characteristic. Generally, the procedure for setting up such a system consists of manually selecting, either on the basis of line measurements or by trial and error, the fixed amplitude equalizer that best fits the attenuation distortion characteristics of the line. This particular equalizer is then strap selected into the transmitter. This process requires operator intervention and can be quite time consuming. Also, it is evident that such a technique is not very useful in adapting to changing line conditions. Such equalization can only practically be handled by an automatic equalization scheme.

In U.S. Pat. No. 4,489,416 to Stuart, a system for providing automated transmitter equalization is provided. In this patent, a central modem individually polls a number of remotely located modems for data. An adaptive equalizer in the central modem is initially trained to minimize the communication link interference from the remote modem and develops a set of equalizer coefficients (based upon the initial training sequence) which is transmitted to the remote modem and stored there for future use. When the remote modem is later polled, the stored equalizer coefficients are used to set the adaptive equalizer of the remote modem.

Unfortunately, the above arrangement of Stuart requires that the actual coefficients be transmitted over the transmission line for use by the remote modem. Since such equalizers for high speed modems may require 48 or more such coefficients which are expressed as complex numbers, this requires the transmission of perhaps 96 or more 8-bit words before equalization can take place. Furthermore, if such coefficients are transmitted utilizing a highly robust secondary channel (typically operating at 75 bits per second) the transmission of the coefficients alone can take well over ten seconds to achieve. In addition, the Stuart patent requires that a special equalizer training sequence be transmitted in order to determine those equalizer coefficients. This further increases the overhead of the protocol resulting in further loss of efficient utilization of the transmission media.

The present invention alleviates these and other problems associated with the prior technology.

SUMMARY OF THE INVENTION

It is an object of the present invention to provide an improved automatic transmitter equalization system.

It is another object of the present invention to provide a method and apparatus for automatic transmitter equalization in a data communication system which may be implemented with minimal departure from conventional modem hardware and protocol.

It is a further object of the present invention to provide a method and apparatus for automatic transmitter amplitude equalization which requires minimal overhead to implement.

These and other objects of the invention will become apparent to those skilled in the art upon consideration of the following description of the invention.

In one embodiment of the present invention a data communication system including a first and second transceiver is coupled together through a transmission channel. A measuring circuit is coupled to the first transceiver for measuring the effects of the transmission characteristics on a known signal transmitted from the second transceiver to the first transceiver. A mapping is made from the transmission characteristics to a code. The code is transmitted from the first transceiver to the second transceiver. A filter coupled to the second transceiver is selected from a plurality of predetermined filters for use in filtering signals to be transmitted by the second transceiver. A decoder is coupled to the second transceiver for receiving the code and selecting one of the predetermined filter characteristics for use by the second transceiver.

In another embodiment of the present invention, a method of providing automatic equilization operation, includes the steps of:

- transmitting an equalizer training sequence from a first modem to a second modem;
- separating the training sequence into upper band edge, lower band edge and carrier frequency signals at the second modem;
- analyzing the upper and lower band edge signals and the carrier frequency signal as a measure of line distortion;
- transmitting a code word to the first modem, the code representing a transmitter equalizer appropriate for correction of the line distortion; and
- selecting the transmitter equalizer at the first modem.

The features of the invention believed to be novel are set forth with particularly in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

FIG. 1 shows a basic data communication system utilizing data modems.

FIG. 2 shows a circuit arrangement for measuring the channel characteristics.

DETAILED DESCRIPTION OF THE INVENTION

Figures 3, 4, 5, 6:
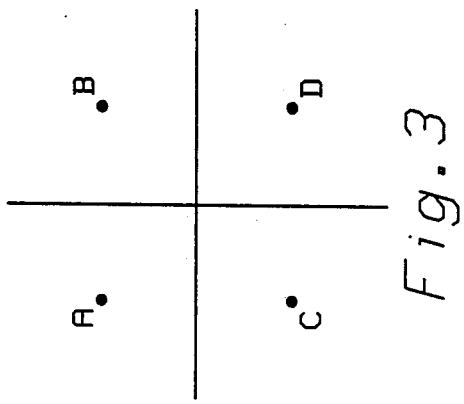
FIG. 3 is a simple modem constellation used to illustrate the present invention.
FIG. 4 is a table describing the operation the low frequency quantizer of FIG. 2.
FIG. 5 is a table describing the operation of the high frequency quantizer of FIG. 2.
FIG. 6 is a table illustrating the operation of the mapper of FIG. 2.

Turning now to FIG. 1, the present invention can be understood by considering by way of example the simple data communication system shown. In this system, two modems, labeled modem A and modem B and designated 20 and 22 respectively, are coupled together via a transmission channel 24. According to the present invention a training sequence is initially transmitted for example, from modem A to modem B. This training sequence can be the same training sequences frequently used to establish modem synchronization. The training sequence includes preferably upper and lower band edge energy as well as energy at the center frequency or carrier frequency of the system. This signal passes through channel 24 where the amplitude distortion of the channel affects the signal received by modem B. Modem B separates the received frequencies into upper band edge, lower band edge and carrier frequencies. Modem B then compares the amplitudes the signals and maps those amplitudes to a predetermined code. This code relates to the characteristics of channel 24, and the code transmitted back to modem A. Modem A then decodes the transmitted code and appropriately selects one of a plurality of equalizers for use in future transmissions to modem B. Preferably, the code is transmitted via a highly robust secondary channel such as is commonly used in such data communications. Preferably such secondary channel data is transmitted with a very high degree of reliability at a very low rate such as 75 or 150 bps but this is not to be limiting as primary channel can also be used. Secondary channel communications are known and described, for example, in U.S. Pat. No. 4,385,384 to Rosbury et al., which is hereby incorporated by reference.

Turning now to FIG. 2, an arrangement is shown for analyzing the training sequence transmitted by modem A in the procedure described above. Transmission channel 24 is coupled to a transmission line interface 30 which may include line drivers, amplifiers, matching circuitry, loop back circuitry as well as other known circuitry used to interface a modem transmitter and receivers to a transmission line. The received signal is delivered to node 32 which is in turn coupled to each of three filters 34, 36 and 38. Filter 34 is a bandpass filter centered around the lower band edge. Filter 36 is a bandpass filter centered about the carrier frequency and filter 38 is a bandpass filter centered about the upper band edge.

Filters 34 and 38 are frequently already present in the modem for extracting timing or other information as described in U.S. Pat. No. 4,455,665 to Kromer and U.S. patent application Ser. No. 654,187 to Martinez which are hereby incorporated by reference.

In the example shown in FIG. 2, the example of a 1700 HZ carrier frequency is used. Such carrier is common on, for example, a four phase QAM 2400 symbols per second modem having a constellation such as that shown in FIG. 3. The training sequence used for the present invention may be generated from the constellation of FIG. 3 by simply transmitting the repeating pattern ABABABAB . . . for a sufficiently long period of time. This transmitter output signal can be modeled by equation 1 as follows:

$$V(t) = A \cos((\omega_c - \omega_s)t + \theta_1) + B \cos((\omega_c + \omega_s)t + \theta_2) + C \cos(w_c t) \qquad \text{Equation 1}$$

where:

A = amplitude of lower band edge signal
B = amplitude of upper band edge signal
C = amplitude of carrier frequency signal
$\omega_c$ = carrier angular frequency ($2\pi F_c$)
$\omega_s = \frac{1}{2}$ the symbol angular frequency ($2\pi F_s/2$)
$F_c = 1700$ Hz
$F_s = 2400$ Hz
t = time
$\theta_1$ = Phase shift of the lower band edge signal due to channel and filter characteristics.
$\theta_2$ = Phase shift of the upper band edge signal due to channel and filter characteristics.
V(t) = Transmitter output signal.

In this case, the two band-edge signals will occur at $F_c - F_s = 500$ Hz (lower) and $F_c + F_s = 2900$ Hz (upper).

The outputs of filters 34, 36 and 38 at nodes 44, 46 and 48 respectively are applied to multipliers 54, 56 and 58 respectively. These multiplier outputs at nodes 64, 66 and 68 respectively are applied to low pass filters 74, 76 and 78 convert the squared signals to ADC voltage level present at nodes 84, 86 and 88.

Since a data modem typically is provided with an automatic gain control, the absolute levels of these three signals representative of upper and lower band edge and carrier frequency are not important. There absolute levels will be managed by the modem's automatic gain control. For purposes of the present invention, it is only the amplitudes of the upper band edge and lower band edge signals relative to the carrier signal which is important. However, those skilled in the art will recognize that an analysis of absolute levels may alternatively be used in the present invention. The voltage at node 86 is subtracted from the voltage at node 84 by subtractor 90 to produce a different signal DL at node 92. Similarly, the voltage at node 86 is subtracted from the voltage at node 88 by a subtractor 96 to produce a different signal DH at node 98.

Since it is not vital for purposes of the present invention that an absolute correction of the amplitude distortion be achieved in the transmitter, rather only a coarse adjustment is to be achieved, the level at node 92 is processed by a quantizer 100 to produce a quantized signal L1 at node 102. In a similar manner the signal present at node 98 is quantized by a quantizer 106 to produce a quantized signal L2 at node 108. These quantized signals are received by a mapper/encoder 110 which processes a L1 and L2 and maps those levels into a code to be transmitted by a secondary channel transmitter 112. Secondary channel transmitter 112 provides this code to line interface 30 for transmission over transmission channel 24 to the modem at the other end.

The mapping function performed by mapper/encoder 110 may very greatly depending upon the speed of the modem (and thus the amount of amplitude distortion and noise which can be tolerated by the modem), the number of equalizers which can be efficiently implemented as well as the amount of variation present in the types of transmission lines to be corrected. By way of example, FIGS. 4, 5 and 6 describe the operation of mapper encoder 110 for a transmission line which may be subject to amplitude distortion of low frequency signals ranging from gain of several DB down to attenuation of perhaps approximately 6DB. In this illustrative example shown in FIG. 4, signal DL is quantized to a value of plus 1 for signals greater than zero DB relative to the reference signal at node 86. (It should be noted that a mapping of the DC voltages at nodes 84, 86 and 88 to actual DB level should be generated to correlate the actual DB values to relative DC levels). Attenuation as great as minus 3 DB relative to the carrier is quantized to zero at L1 and attenuation greater than 3 DB is quantized to minus 1 at L1.

Turning to FIG. 5, the high frequency quantization assumes that attenuation will generally be present for the high frequencies. This has generally been found to be the case in most data communications transmission lines. The quantization shown in FIG. 5 will accommodate attenuation from approximately zero DB down to approximately minus 12 or 14 DB relative to the carrier frequency. Signals greater than minus 3 DB are quantized to pulse 1 at L2. Signals between minus 3 DB and minus 9 DB are quantized to 0 at L2 and signals less than minus 9 DB are quantized to minus 1 at L2.

Turning now to FIG. 6, it is seen that with the quantization shown in FIG. 4 and 5 nine possible equalizers may be utilized depending upon the measured values quantized to L1 and L2. By way of example, for L1 equals zero and L2 equals zero, equalizer number 5 would be selected. This equalizer would preferably have approximately one and a half DB of gain at the lower band edge and approximately 6 DB of gain at the upper band edge. This allows for correct equalization of signals falling in the central region of the ranges corresponding to L1 equals zero and L2 equals zero. Those skilled in the art will readily appreciate that other quantizations and other mappings may be suitable for various applications.

In the present example nine possible equalizers may be accommodated but this should not be limiting. Since non equalizers may be uniquely characterized in the present example, the desired equalizer may be encoded as a four bit binary number as shown. Thus, only four bitts of information need be transmitted to establish the equalizer to be used in the remote transmitter. Those skilled in the art will also recognize that the codes as well as the relative levels of attenuation, etc. in the present example are merely illustrative and not be limiting. It will also be appreciated that some amount of overhead will likely be needed in order to effect transmission of an entire message so that more than four bits of information will likely change hands in order to actually implement the present invention. More exact equalization can be achieved by providing more levels of quantization as well as an associated increase in the number of available equalizers.

Figure 7:
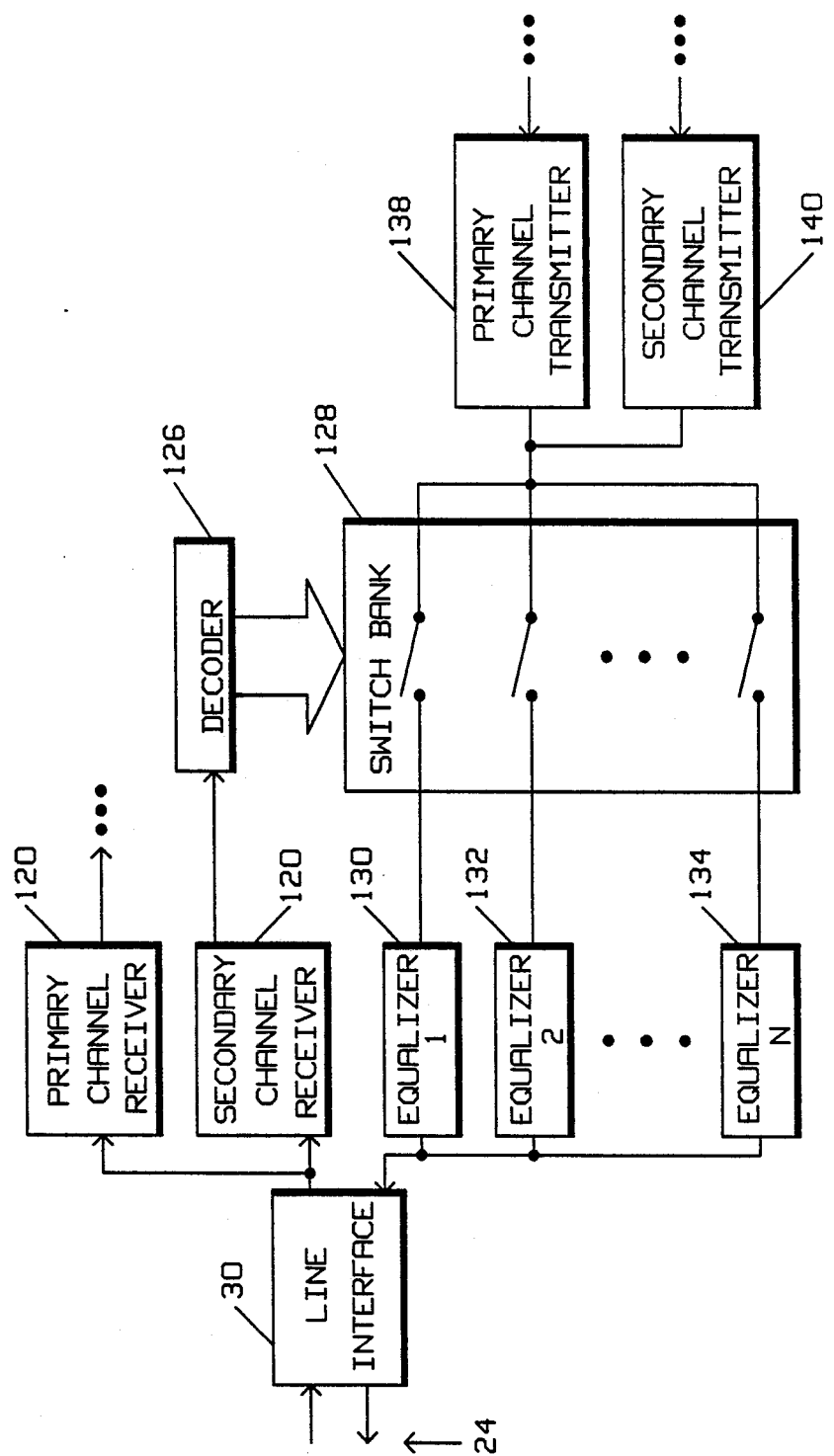
FIG. 7 is a diagram of the transmitter equalizer of the present invention.

Turning now to FIG. 7, a block diagram of circuitry used to process the coded signal transmitted by secondary channel transmitter 112 is shown. Line interface 30 is coupled to a primary channel receiver 120 which is used to process incoming user data. A secondary channel receiver 122 is also coupled in parallel to primary channel receiver 120 and coupled to line interface 30. Secondary channel receiver 122 provides the coded signal transmitted by transmitter 112 to a decoder 126. Decoder 126 controls a switch bank 128 which is used to couple one of a plurality of equalizers 130, 132 and 134 into the transmitter signal path. Depending upon the switch selection, any one of N possible equalizers may be placed between a primary channel transmitter 138 and line interface 30. The selected equalizer may be also be used to process the transmission from secondary channel transmitter 140.

Figure 8:
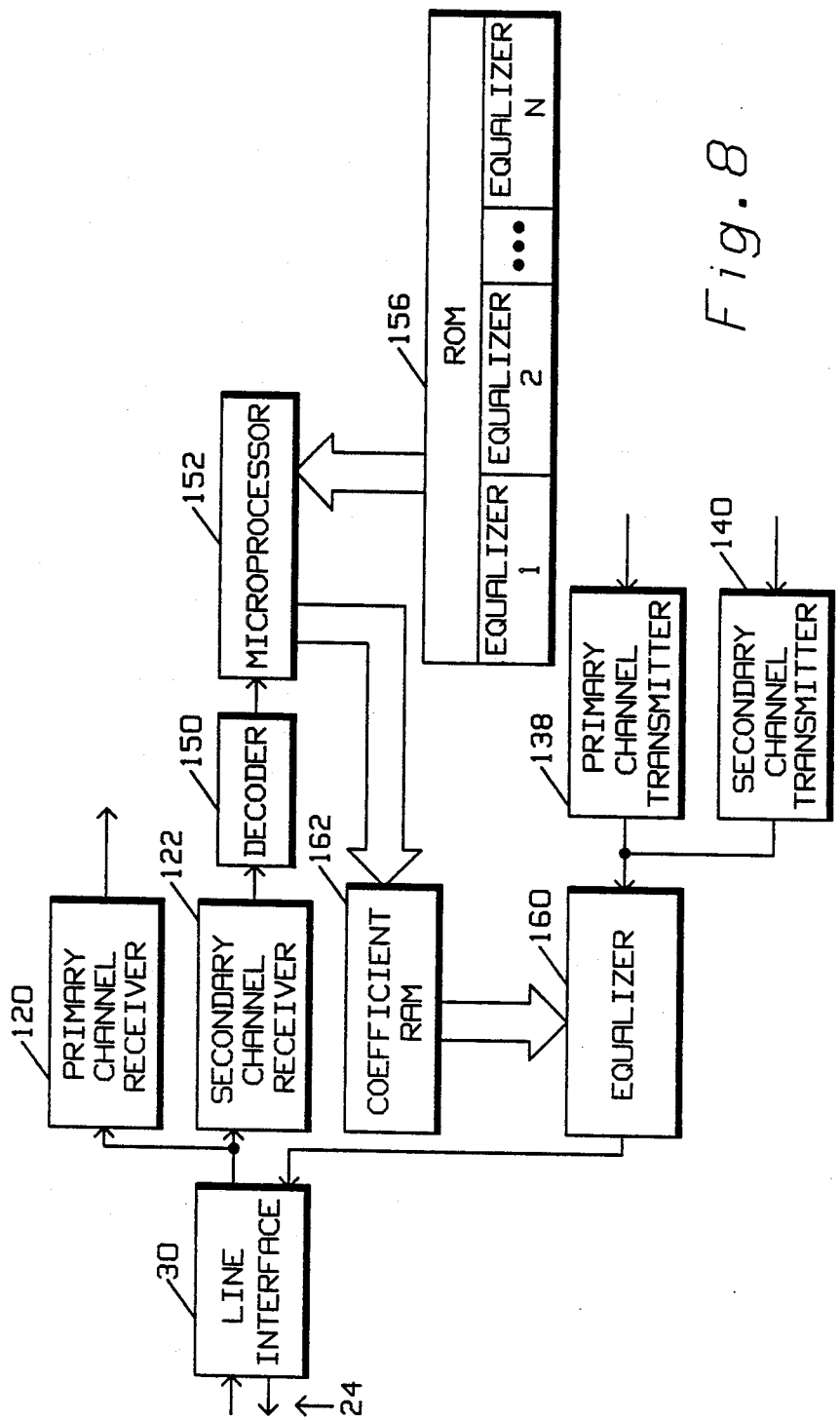
FIG. 8 shows one embodiment of the transmitter equalizer of the present invention.

The system shown in FIG. 7 may be viewed either as a conceptual description of the present invention or may be viewed as an operable physical embodiment where equalizers 1 through N are separate and distinct analog equalizer filters or digital equalizer filters. The block diagram shown in FIG. 7 is helpful in understanding the principle of the present invention. However, in preferred embodiments of the present invention digital technology is used for implementing the transmitter equalizer and the selection of equalizers is accomplished by modification or selection of digital filter coefficients. One such implementation is shown in FIG. 8.

In this implementation, a coded signal from secondary channel 122 is provided to a decoder 150 which decodes the signal and passes it on to a microprocessor 152. Microprocessor 152 is coupled to a memory 156 which may be a read only memory. Memory 156 stores a plurality of sets of equalizer coefficients for use by an equalizer 160. In accordance with the coded signal received by microprocessor 152, the microprocessor unloads a predetermined set of equalizer coefficients from memory 156 and transfers that set of coefficients to a coefficient memory 162 which may be a random access memory. The desired filter characteristics may thus be implemented by appropriately selecting from a predetermined group of equalizers characterized by a plurality of sets of equalizer coefficients. Of course those skilled in the art will recognize that the currently available high speed powerful microprocessors are capable of performing many of the functions shown in the functional blocks of FIG. 8. For example, decoder 150, microprocessor 152, and equalizer 160 may all be implemented by a signal microprocessor. Processors such as the TMS 320 series digital signal processors by Texas Instruments ® are well suited to this type of application.

Figure 9:
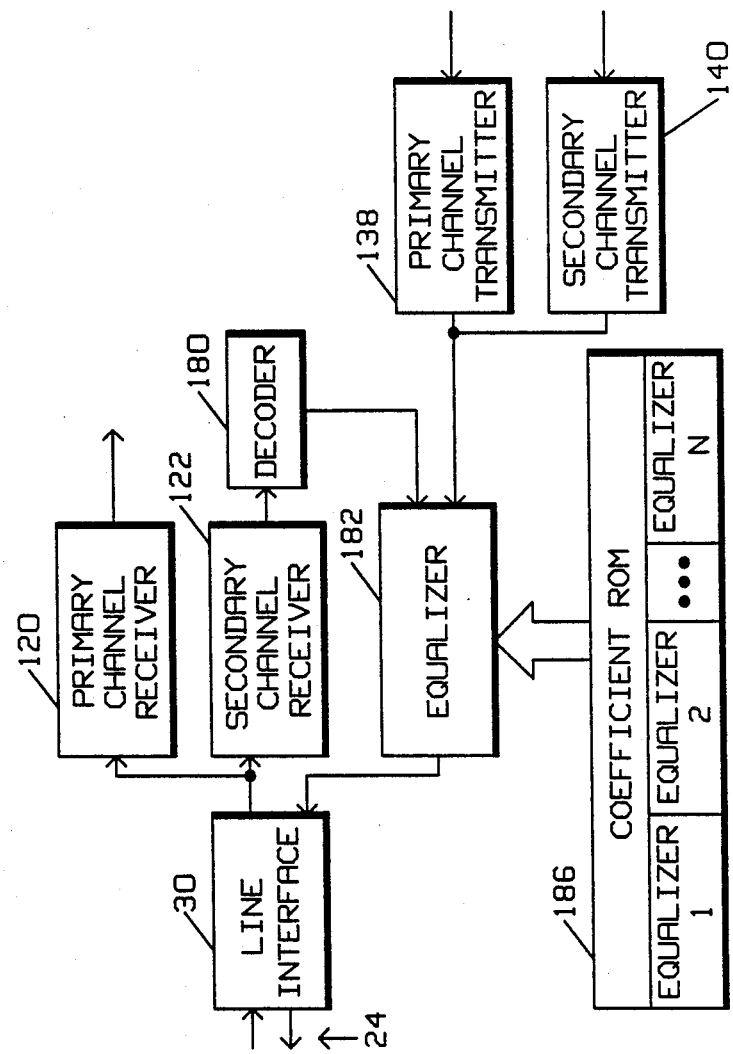
FIG. 9 shows another embodiment of the transmitter equalizer of the present invention.

Turning now to FIG. 9, an alternative embodiment is shown in which the coded signal from secondary channel receiver 122 is passed to a decoder 180 this decoder 180 is used to map the coded signal to a memory address pointer. This pointer is then transmitted to a digital equalizer 182 which is coupled to a coefficient memory 186 which includes a plurality of sets of equalizer coefficients in different locations thereof. In this embodiment, the pointer is utilized to instruct equalizer 182 what portion of the coefficient memory contains the desired equalizer coefficients needed to affect equalization.

Of course those skilled in the art will recognize that numerous architectures may be utilized for effecting implementation of a variety of different equalizers without departing from the present invention. Accordingly, the present invention is not limited to the specific examples shown herein.

Figure 10:
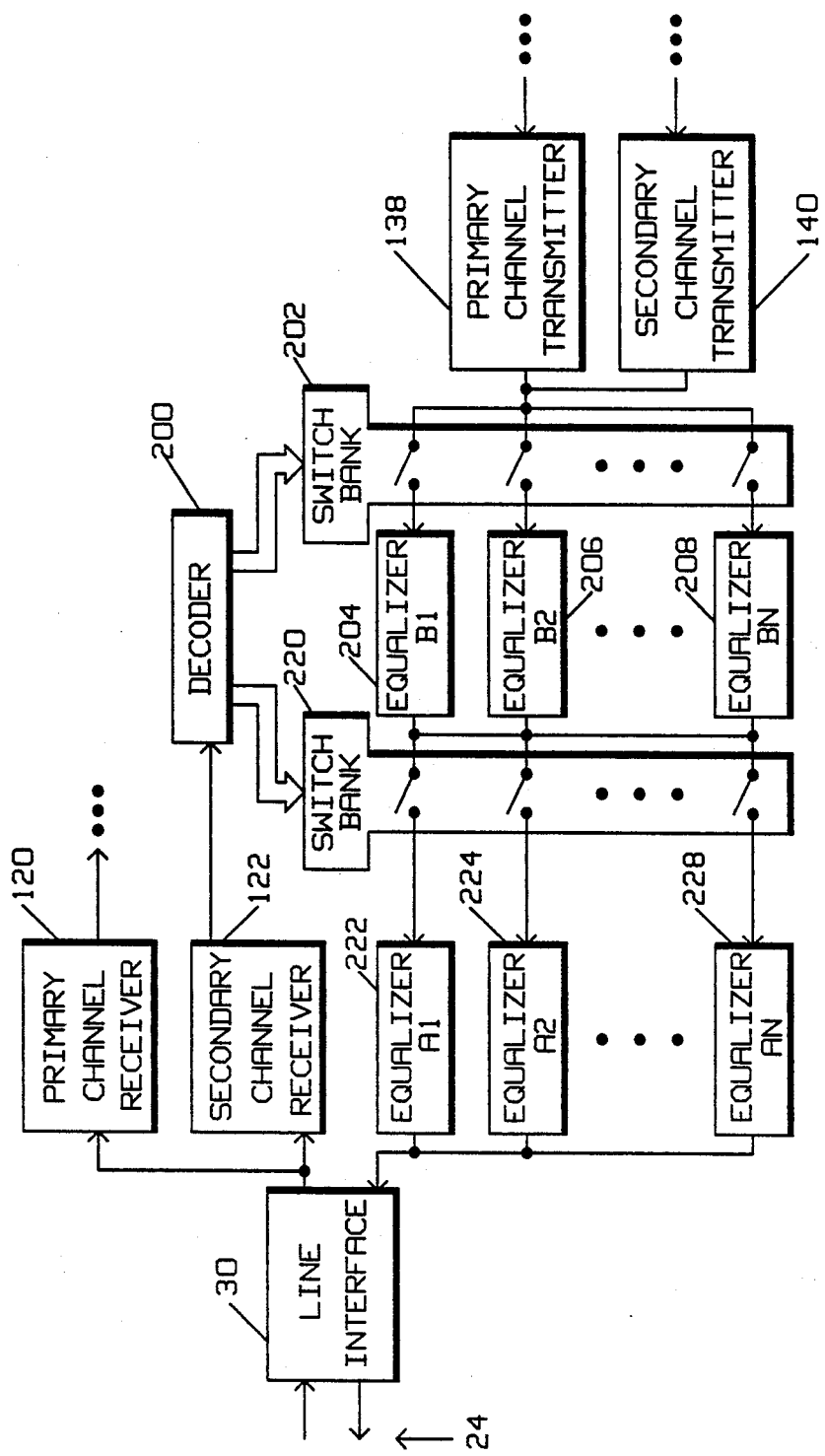
FIG. 10 shows another embodiment of a transmitter equalizer according to the present invention.

Turning now to FIG. 10, another embodiment of the present invention is shown. This embodiment contemplates the use of separate equalizers for the upper frequency range and for the lower frequency range. In accordance with this embodiment, the coded signal received by secondary channel receiver 122 may actually be a coded form of the individual quantized levels L1 and L2 or alternatively it can be a code as previously described. This coded signal is decoded by decoder 200 in order to ascertain which type of equalization is to be utilized for both high frequencies and for low frequencies. The high frequency equalization is selected by appropriate closure of one of the switches in a switch bank 202. Depending on the switch which is closed, any of high frequency filters 204, 206 through 208 may be selected to be interposed in the signal path. In a similar manner any of the switches in switch bank 220 may be selectively closed in order to route the signal to be equlized through any of equalizers 222, 224 through 228. It should be noted that the embodiment shown in FIG. 10 may be viewed in a manner similar to that of the embodiment shown in FIG. 7 in that it may be interpreted as a conceptual block diagram or an actual physical embodiment.

Figure 11:
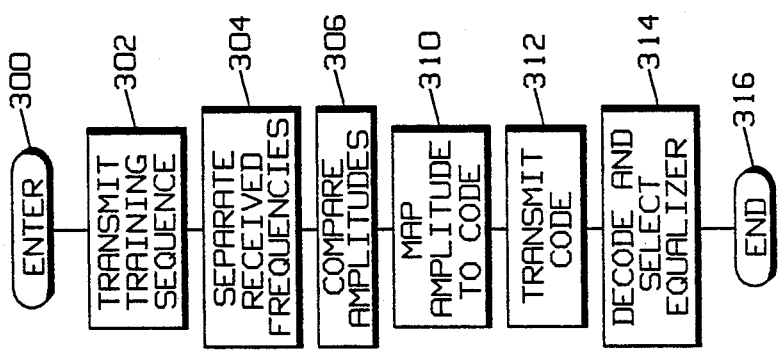
FIG. 11 is a flow chart describing the operation of a system according to the present invention.

The actual process for the present invention may be summarized by the flow diagram shown in FIG. 11. The process starts at step 300 after which a training sequence is transmitted from modem A to modem B at step 302. At step 304, the training sequence is received by modem B and the upper and lower band edge and carrier frequencies are separated. At step 306 the relative amplitudes of the three separate signals are compared and in step 310 the relative amplitudes are mapped to a code. At step 312 the code is transmitted from modem B back to modem A and at step 314 modem A decodes the receiver code and selects and appropriate equalizer which it then interposes in its transmit signal path. The process terminates at step 316. Many variations are of course possible without departing from the present invention.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A data communication system, comprising:
   a first and a second transceiver coupled together through a transmission channel, said transmission channel having transmission characteristics;
   said first transceiver including a first transmitter and a first receiver;
   said second transceiver including a second transmitter and a second receiver;
   said first transceiver comprising:
      measurement means, coupled to said first receiver, for measuring the effects of said transmission characteristics upon a known training signal transmitted from said second transmitter, to said first receiver, said known training signal having predetermined spectral characteristics known to said first receiver;
      mapping means coupled to said measurement means, for mapping said measured transmission characteristics to a predetermined code; and
      means for transmitting said code from said first transmitter to said second receiver;
   said second transceiver comprising;
      filtering means for providing a plurality of predetermined filter characteristics for use in filtering signals to be transmitted by said second transmitter; and
      decoding means for receiving said code and for selecting an unique one of said predetermined filter characteristics corresponding to said transmitted code for use by said second transmitter.

2. The apparatus of claim 1, wherein said filtering means further comprises a digital filter having a plurality of sets of filter coefficients, and wherein said decoding means selects one of said sets of filter coefficients in order to effect said selection of said filter characteristics.

3. The apparatus of claim 1, wherein said first and second transceivers communicate using a predetermined frequency range and wherein said known training signal includes energy near the upper and lower edges of said frequency range as well as energy near the center frequency of said frequency range.

4. The apparatus of claim 3, wherein said measurement means includes:
   upper edge filtering means for extracting said upper edge energy from said known training signal;
   lower edge filtering means for extracting said lower edge energy from said known training signal;
   center filtering means for extracting said center frequency energy for said known training signal; and
   comparing means for comparing the relative amplitudes of said upper edge, lower edge and center frequency energy.

5. The apparatus of claim 4, wherein said mapping means further includes means for mapping the relative amplitudes of said upper edge, lower edge and center frequency energy to said code.

6. The apparatus of claim 1, wherein said filtering means includes a plurality of low frequency equalizing filters and a plurality of high frequency equalizing filters, and wherein said decoding means includes means for selecting one of each of said low and high frequency equalizing filters in response to said code.

7. The apparatus of claim 2, further including means responsive to said decoding means for selecting one of a plurality of sets of filter coefficients stored in a first memory and for moving one of said sets of filter coefficients to a second memory.

8. The apparatus of claim 2, wherein said decoder means includes means for translating said code to a memory pointer and wherein said memory pointer points to a memory location storing said selected set of filter coefficients.

9. A method of providing automatic transmitter equalizer operation, comprising the steps of:
- transmitting an equalizer training sequence from a first modem to a second modem;
- separating said training sequence into upper band edge, lower band edge and carrier frequency signals at said second modem;
- analyzing said upper and lower band edge signals and said carrier frequency signal as a measure of line distortion;
- generating a code word corresponding to said measured line distortion;
- transmitting said code word to said first modem, said code representing a transmitter equalizer appropriate for correction of said line distortion; and
- selecting said transmitter equalizer represented by said code word at said first modem.

10. The method of claim 9, wherein said analyzing step further includes the step of determining the amplitudes of said upper and lower band edge signals relative to said carrier frequency signal.

11. The method of claim 9, wherein said selecting step includes the step of selecting a set of equalizer coefficients from a group of stored equalizer coefficients for use by a digital filter based equalizer.

12. The method of claim 9, wherein said transmitting step includes transmitting said code word over a low speed secondary channel.

13. A method of selecting a transmitter equalizer for a data modem's transmitter, comprising the steps of:
- transmitting a training signal to a remote modem, said training signal having spectral characteristics known to said remote modem;
- receiving a code word from said remote modem, said code word being generated by said remote modem as a function of distortion in said spectral characteristics of said training signal as received and measured by said remote modem;
- matching said code word to one of a plurality of possible predetermined equalizer; and
- selecting said equalizer for use by said data modem transmitter.

14. The method of claim 13, wherein said selecting step further includes the step of selecting a set of equalizer coefficients from a group of stored equalizer coefficients for use by a digital filter based equalizer.

15. A method of selecting a transmitter equalizer for a remote modem, comprising the steps of:
- at a local modem, receiving a training sequence from said remote modem, said training sequence having predetermined spectral characteristics known to said local modem;
- filtering said training sequence to produce signals at a plurality of frequency ranges;
- analyzing said signals to obtain an indication of transmission channel distortion;
- mapping said distortion to a predetermined code word; and
- transmitting said code word to said remote modem to select said transmitter equalizer for use by said remote modem.

16. The method of claim 15, wherein said analyzing step includes the step of comparing the amplitudes of said signals at said plurality of frequency ranges to a predetermined one of said signals to determine the relative performance of said transmission channel at each of said predetermined frequencies.

17. The method of claim 16, wherein said plurality of frequency ranges includes an upper and a lower band edge signal and a carrier frequency signal, and wherein said upper and lower band edge signals are compared in amplitude with said carrier frequency signal.

* * * * *